US012607150B2

(12) United States Patent
Giordana et al.

(10) Patent No.: US 12,607,150 B2
(45) Date of Patent: Apr. 21, 2026

(54) FUEL SYSTEM FOR A SPARK IGNITION ENGINE

(71) Applicants: FPT INDUSTRIAL S.P.A., Turin (IT); LANDI RENZO SPA, Reggio Emilia (IT)

(72) Inventors: Sergio Giordana, Turin (IT); Marco Micellone, Turin (IT); Stefano Brunetti, Reggio Emilia (IT); Marco Verrocchio, Reggio Emilia (IT); Andrea Costa, Reggio Emilia (IT); Massimo Ferrera, Reggio Emilia (IT)

(73) Assignees: FPT INDUSTRIAL S.P.A., Turin (IT); LANDI RENZO SPA, Reggio Emilia (IT)

( * ) Notice: Subject to any disclaimer, the term of this patent is extended or adjusted under 35 U.S.C. 154(b) by 0 days.

(21) Appl. No.: 18/718,149

(22) PCT Filed: Dec. 7, 2022

(86) PCT No.: PCT/IB2022/061880
§ 371 (c)(1),
(2) Date: Jun. 10, 2024

(87) PCT Pub. No.: WO2023/105439
PCT Pub. Date: Jun. 15, 2023

(65) Prior Publication Data

US 2025/0043741 A1 Feb. 6, 2025

(30) Foreign Application Priority Data

Dec. 9, 2021 (IT) ........................ 102021000030989

(51) Int. Cl.
*F02D 19/08* (2006.01)
*F02D 19/06* (2006.01)

(52) U.S. Cl.
CPC ....... *F02D 19/081* (2013.01); *F02D 19/0626* (2013.01); *F02D 19/0644* (2013.01); *F02D 2200/0612* (2013.01)

(58) Field of Classification Search
CPC .... F02D 19/081; F02D 19/085; F02D 19/088; F02D 19/082; F02D 19/0626; F02D 19/0644; F02D 2200/0612
See application file for complete search history.

(56) References Cited

U.S. PATENT DOCUMENTS 5,666,926 A * 9/1997 Ferrera ................. F02D 19/066 123/575
5,944,014 A * 8/1999 Webb ..................... A61B 17/42 128/845

(Continued)

FOREIGN PATENT DOCUMENTS

DE 102019200408 A1 7/2020
EP 0997627 A2 5/2000

(Continued)

*Primary Examiner* — Syed O Hasan
(74) *Attorney, Agent, or Firm* — Bayramoglu Law Offices LLC

(57) ABSTRACT

Method of supplying a spark-ignition internal combustion engine is provided. The method includes a mixing procedure, on board the vehicle, of methane and hydrogen and in which a ratio between methane and hydrogen is determined at least as a function of a methane quality. A spark ignition internal combustion engine includes at least one cylinder having an intake manifold and at least one methane and hydrogen injection device.

8 Claims, 3 Drawing Sheets

(56) References Cited

U.S. PATENT DOCUMENTS

| | | | | |
|---|---|---|---|---|
| 8,944,014 B2 * | 2/2015 | Cutlip | F02D 19/029 123/3 |
| 2009/0120385 A1 * | 5/2009 | Munshi | F02D 19/10 123/3 |
| 2017/0157563 A1 * | 6/2017 | Ginter | B01D 53/9418 |
| 2017/0268438 A1 * | 9/2017 | Flohr | F02D 41/0027 |

FOREIGN PATENT DOCUMENTS

| | | | |
|---|---|---|---|
| EP | 3161469 | A1 | 5/2017 |
| EP | 3425185 | A1 | 1/2019 |
| WO | 2009079725 | A1 | 7/2009 |
| WO | 2020223441 | A1 | 11/2020 |

* cited by examiner

FUEL SYSTEM FOR A SPARK IGNITION ENGINE

CROSS-REFERENCE TO THE RELATED APPLICATIONS

This application is the national phase entry of International Application No. PCT/IB2022/061880, filed on Dec. 7, 2022, which is based upon and claims priority to Italian Patent Application No. 102021000030989, filed on Dec. 9, 2021, the entire contents of which are incorporated herein by reference.

TECHNICAL FIELD

The present invention relates to the field of positive-ignition engines of the type comprising a spark plug and in particular to fuel supply systems.

BACKGROUND

Hydromethane is a gaseous mixture composed of 10%-30% by volume of hydrogen and 70%-90% by volume of methane, mainly used in the automotive sector as fuel. The presence of hydrogen helps to improve engine combustion efficiency and reduce CO2 equivalent and NOx emissions into the atmosphere, as hydrogen is a clean energy source.

Both the methane gas and the hydrogen gas constituting hydromethane can be produced biologically or through synthesis processes, increasing the use of renewable energy sources and further contributing to the decarbonisation objectives of the automotive field.

Given the properties of hydromethane, it was thought in the past to distribute methane with added hydrogen at about 10% by volume, to exploit the advantages of the mixture. This artificially generated hydromethane is generally referred to as “industrial hydromethane”.

However, the diffusion of industrial hydromethane is still scarce and the percentages of hydrogen are not constant and difficult to predict.

In view of a greater diffusion of the hydrogen vector in the energy system, the gas distribution system envisages a partial use of the methane gas networks to inject hydrogen and in this way be able to convey it from the point of production to the point of use. Recent studies have demonstrated the compatibility of low pressure methane gas distribution networks up to hydrogen percentages of the order of 10-15% (by volume).

It is therefore possible that in the future the gas distribution system will contain this type of mixture.

However, this approach is still unclear at European level, neither in terms of timing nor in terms of location of the hydrogen injection points.

From the point of view of use through the automotive system, this approach is therefore still highly uncertain.

Furthermore, considering the case of using methane in liquid form (LNG), it is not possible to mix hydrogen in the liquefied methane due to the different liquefaction temperatures. Therefore, currently, it is not possible to predict a capillary diffusion of hydromethane.

Unless specifically excluded in the detailed description that follows, what is described in this chapter is to be considered as an integral part of the detailed description.

SUMMARY

The object of the present invention is to propose a solution to the problems inherent in the use of hydromethane.

The basic idea of the present invention is to propose an injection system for methane and hydrogen so that the hydromethane mixture is created directly on board the vehicle immediately before its combustion.

More particularly, according to the present invention, two injectors are associated with each cylinder, of which a first injector arranged to inject methane in gaseous form and a second injector arranged to inject hydrogen in gaseous form into the intake manifold of the relative cylinder.

It is clear that the two species of methane and hydrogen are stored separately on board the vehicle using separate accumulation tanks. It is also clear that the mixing of the two gaseous species takes place outside the engine, i.e. in the common duct that connects the two injectors to the intake manifold.

A processing unit selectively and independently controls the operation of the two injectors according to certain parameters.

According to the present invention, the methane/hydrogen ratio is calculated at least as a function of the qualities of the methane.

The expression “quality of methane” means its resistance to detonation, strongly dependent on its chemical composition. More generally, it is possible to know various properties of the fuel, including its calorific value and its resistance to detonation.

Devices and methods for estimating the properties of a fuel are known. Examples are in WO2020223441, EP3161469 and EP0997627 incorporated herein by reference.

While in the first case a spectroscopic analysis of the fuel is expected to be performed, in the other cases it is expected to obtain some properties of the fuel indirectly by varying some engine operating parameters and monitoring the effects of this variation by means of an oxygen sensor placed on the exhaust line.

By implementing the solution of WO2020223441 it is possible to estimate the properties of the fuel without interrupting the simultaneous injection of hydrogen.

By implementing the solution described in EP0997627 it is necessary to inhibit the injection of hydrogen until the methane analysis phase is completed.

The analysis of methane properties can be caused by the methane refueling operation or, in the case of LNG, according to pre-established time intervals. For example, depending on the possible temporal evolution of the fuel composition in the vehicle tank.

According to the present invention, therefore, the mixing of the hydrogen depends on the specific properties of the methane on board.

Evidently, these properties vary with the composition of the methane.

According to a preferred embodiment of the invention, the composition of the methane/hydrogen mixture is dynamically varied, as a function of some parameters measured at the exhaust, such as O2, NOx, CO, etc.

Advantageously, thanks to the present invention it is possible to improve the combustion of the internal combustion engine by minimizing the overall fuel consumption and at the same time keeping the quantity of pollutants emitted within predetermined limits.

According to a preferred but non-essential variant of the invention, a methane injector is coupled to a hydrogen injector to define a single multi-species injector. Each injector retains its autonomy in the sense that it can be controlled independently of the other.

Preferably, the two injectors are associated together so as to inject the respective species into a common injection channel, able to be operatively associated with the intake manifold of the relative cylinder.

The common injection runner is a distinct and separate component from the intake manifold.

The multi-species injection device can be associated directly with the relevant intake manifold or via an optionally flexible extension.

According to a preferred implementation of the invention, an internal combustion engine comprises at least one multi-species injection device.

Advantageously, the multi-species injection system according to the present preferred variants allows not only to simplify the assembly of the internal combustion engine, but also allows to limit the sizes of the injection system.

When the internal combustion engine comprises two or more cylinders arranged in line, the corresponding two or more multi-species injection systems share two rails for the distribution of the two fuels, preferably arranged parallel to the crankshaft of the internal combustion engine.

According to a further preferred aspect of the invention, the ratio between methane and hydrogen is varied according to some factors:

Operating point of the engine,

Ambient temperature and/or engine coolant temperature,

Characteristics of methane,

Fuel levels in methane and hydrogen tanks.

The dependent claims describe preferred variants of the invention, forming an integral part of the present description.

BRIEF DESCRIPTION OF THE DRAWINGS

Further objects and advantages of the present invention will become clear from the detailed description that follows of an embodiment of the same (and of its variants) and from the annexed drawings given for purely explanatory and non-limiting purposes, in which.

The same reference numbers and letters in the figures identify the same elements or components or functions.

It should also be noted that the terms “first”, “second”, “third”, “superior”, “inferior” and the like may be used herein to distinguish various items. These terms do not imply a spatial, sequential, or hierarchical order for the modified items unless specifically indicated or inferred from the description.

The elements and characteristics illustrated in the various preferred embodiments, including the drawings, can be combined with each other without however departing from the scope of protection of the present application as described below.

DETAILED DESCRIPTION OF THE EMBODIMENTS

Figure 1:
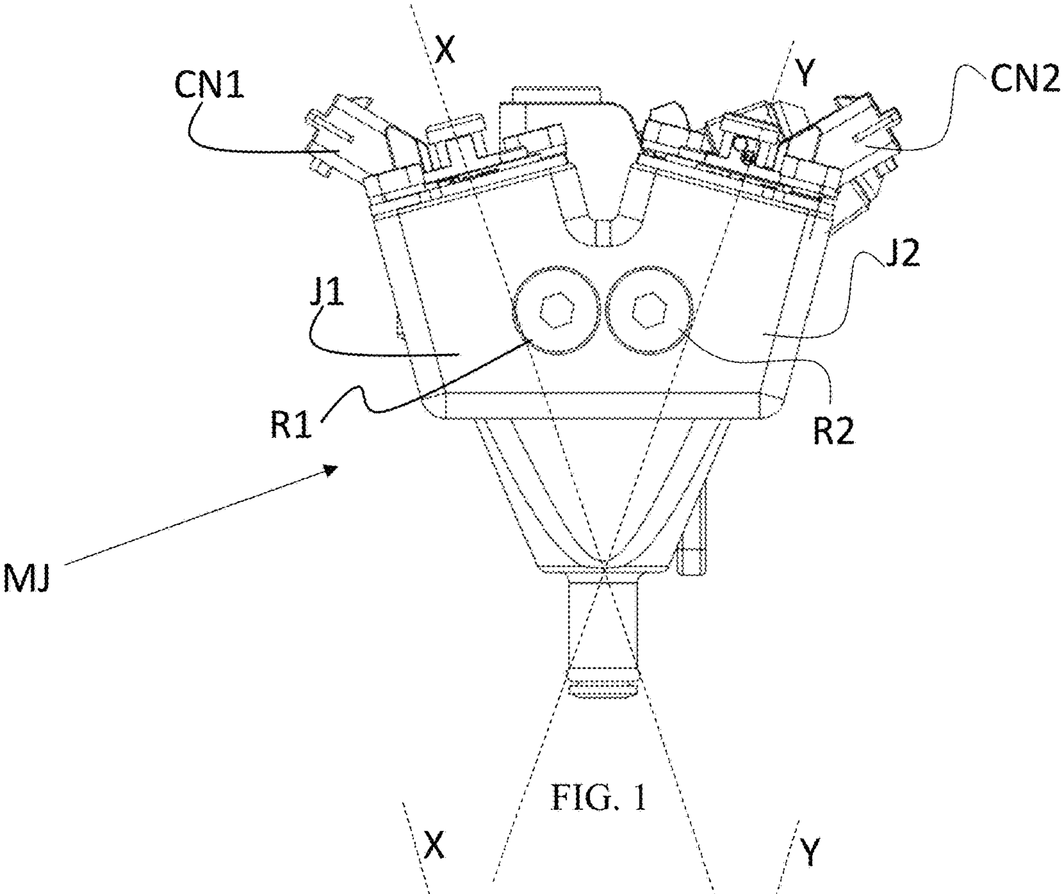
FIGS. 1 and 2 show an embodiment of a multi-species injection device respectively according to a side view and according to a longitudinal section according to a lying plane.

FIG. 1 shows an example of a multi-species injection MJ device according to the present invention. In particular, it is configured for the injection of two different gaseous species.

It comprises a pair of injectors J1, J2 associated together so as to produce a hydromethane mixture directly on board the vehicle during its combustion.

In other words, the blend produced is in no way stored for later use. The mixture produced is injected directly into the intake manifold of a cylinder during its operation, in order to burn it.

It is also worth noting that an injector cannot be confused with a simple valve, as the injector is responsible for dosing the fuel over time, also making multiple injections in the same engine power cycle. In fact, a simple valve does not have the characteristics to open and close as quickly as an injector. Evidently, the engine also sucks air as a combustive agent.

The first injector J1 is arranged to inject methane in gaseous form, while the second injector J2 is arranged to inject hydrogen in gaseous form.

According to the present invention, the hydromethane mixture is varied according to the operating conditions of the engine and preferably according to the characteristics of the methane.

It is known that methane has an equivalent octane number closely related to the composition of the distributed methane.

Therefore, according to a preferred aspect of the present invention, the processing unit arranged to control the operation of the multi-species injector and of the internal combustion engine in general, is configured to mix the two species according to a methane quality.

It is, therefore, configured to perform an analysis procedure A of the quality of the methane and subsequently to determine R a ratio between the two species as a function of at least the quality of the methane, see FIG. 4.

Hydrogen is known to help improve combustion. It is also known that pure methane does not exist and that the presence of heavier hydrocarbons (e.g. ethane, propane) and/or inert gases (e.g. N2, CO2) can lead to variations in its resistance to detonation.

It is worth highlighting that in the context of the present invention when we speak of a mixture we always refer to a mixture of hydrogen and methane, neglecting the fact that methane in itself represents a mixture of other species.

More preferably, it is further configured to determine a ratio between the two species also as a function of the operating conditions of the internal combustion engine.

For example, it can be foreseen to operate the internal combustion engine with a hydrogen-rich mixture:

1) at minimum (idle)
2) in cruising conditions with torque output lower than a pre-set percentage (e.g. 35%) of the maximum torque output,
3) in conditions of very cold intake air and/or still cold engine water.

Conversely, when the temperature of the engine and/or ambient air and/or the engine rotation speed exceeds a predetermined threshold, it is advantageous to limit the percentage of hydrogen so as to ensure an adequate average octane number.

The methane quality analysis procedure can include the inhibition of hydrogen injection until the end of the analysis procedure itself.

Preferably, the analysis procedure is triggered following a refueling of methane gas.

Figure 4:
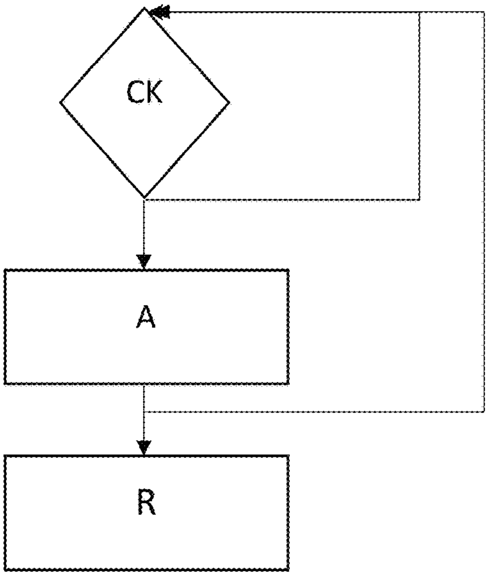
in FIG. 4 shows an example of a method object of the present invention.

FIG. 4 shows a block CK for detecting the methane refueling event. Detection cycles on itself until a refueling procedure occurs. At the end of the determination of quality A of the methane, the diagram cycles again on block CK and at the same time calculates, step R, the ratio between the species.

Obviously, in relation to the percentage of injected hydrogen, the ignition times can be suitably varied taking into account the different composition of the mixture entering the engine.

The management of the species injected into the engine is performed by the ECU processing unit, which controls the internal combustion engine and its subsystems.

Preferably, the ratio between the species is a function not only of the quality of the methane, but also of at least one engine operating parameter such as, for example, cooling water temperature and engine rotation speed.

According to a preferred variant of the invention, the two injectors are associated together so as to inject the respective species into the common injection channel CMC, adapted to be operatively connected to the intake manifold of the relative cylinder.

Figure 2:
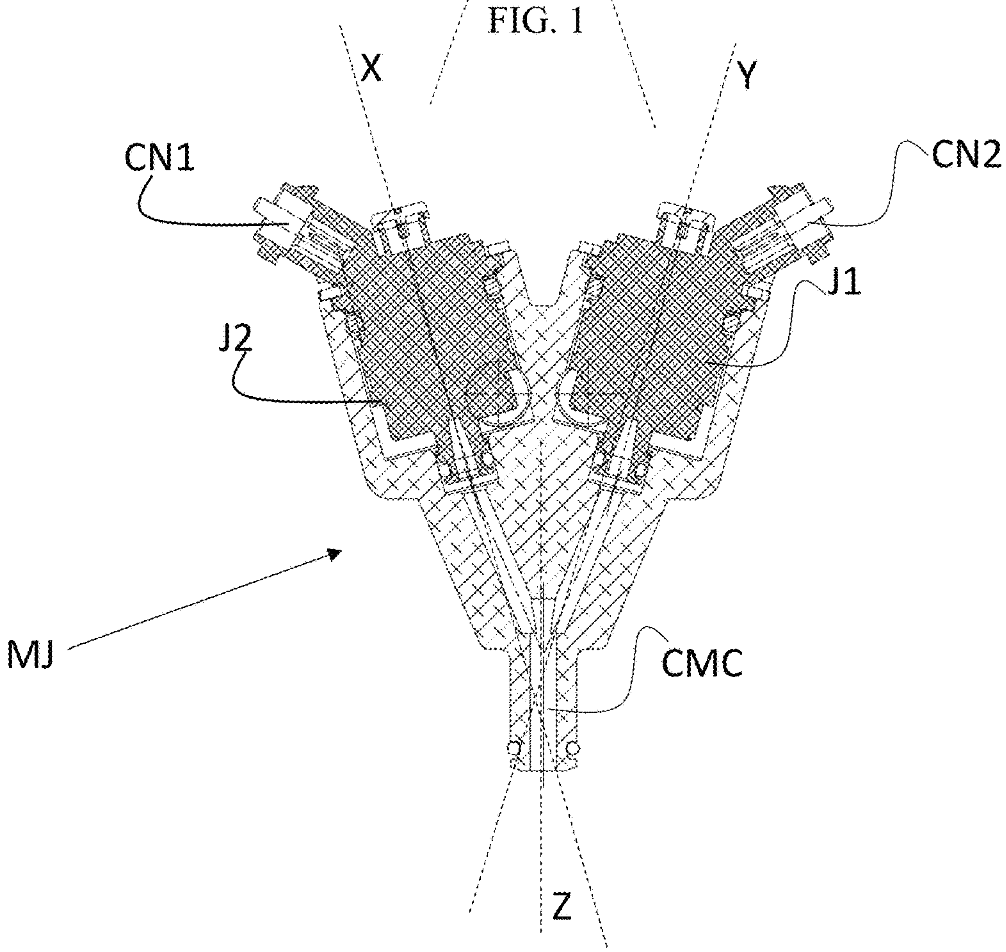
Figure 3:
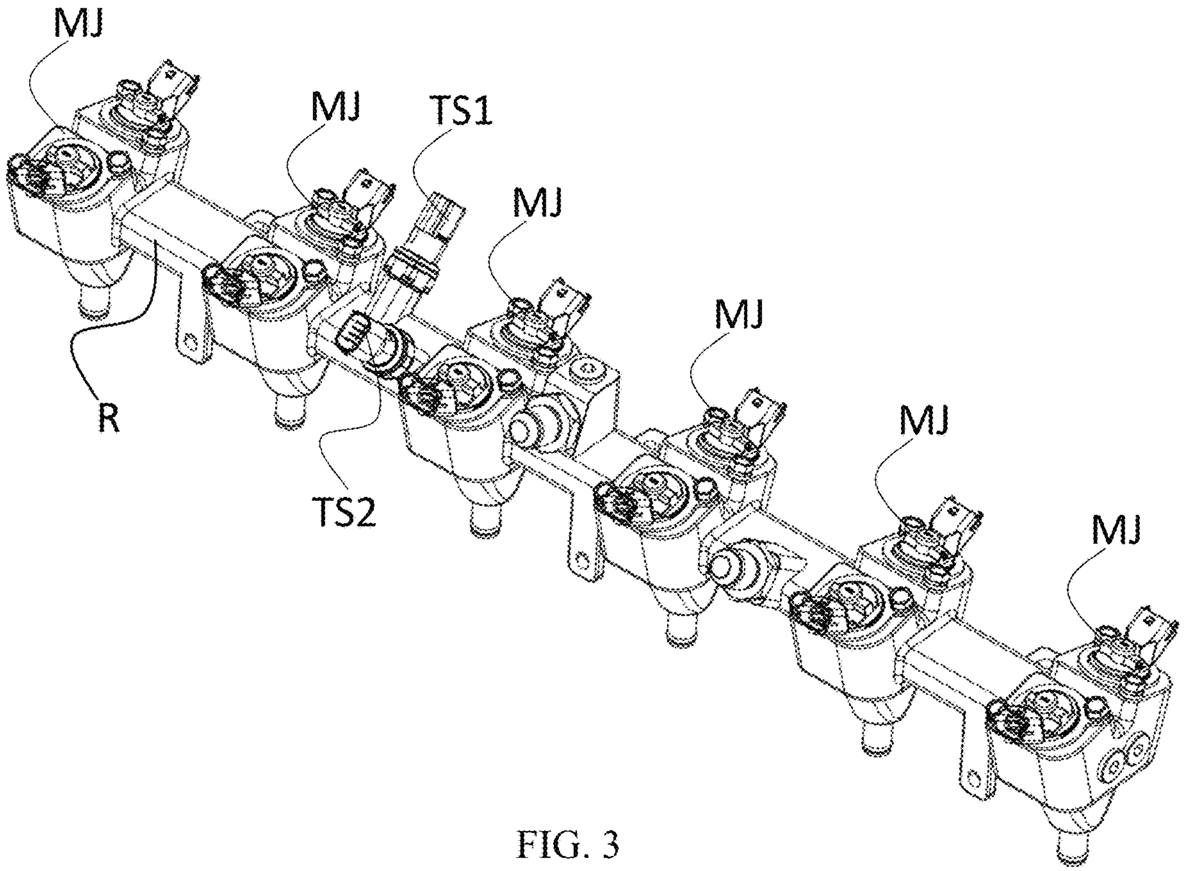
in FIG. 3 there is shown a group of multi-species injection devices associated together to be connected to a positive ignition internal combustion engine.

As can be seen in FIGS. 1 and 2, each injector J1 and J2 defines a development axis, respectively X and Y, so that the development axis of the first injector J1 is incident with the development axis of the second injector J2, defining a configuration V-shaped. More specifically, according to a preferred variant of the invention, the injectors define a Y-shaped configuration with the common injection channel CMC.

Preferably, the angle between the X-axis and the Y-axis is between 10° and 90°.

At the free ends of the V configuration there are electrical connectors CN1 and CN2, which allow to independently control the operation of the respective injectors J1 and J2, so as to obtain a mixture which varies over time.

The common channel CMC can have any shape. It is connected to injectors J1 and J2 at the vertex defined by the point of incidence of straight lines X and Y. It can have a straight or curved shape. Preferably, it has a rectilinear shape and the relative development axis is the bisector of the angle identified by the intersection of the X and Y axes.

However, the development axis Z of the common channel CMC can coincide with the X axis or with the Y axis.

If we consider a plane in which the X and Y axes lie, the Z axis of the common channel can also belong to the same plane or it can be incident with it.

According to a preferred variant of the invention, the common injection channel is made in a body, which is in one piece with the casings of the two injectors.

The common injection channel of the multi-species injection device can be associated directly with the relative intake manifold or by means of an optionally flexible extension.

With reference to FIG. 1, the body of the device MJ comprises a first port R1 and a second port R2 intended to be connected to respective distribution rails of the two types. The doors are perpendicular to the plane identified by the X and Y axes.

According to a preferred implementation of the invention, an internal combustion engine comprises at least one multi-species injection device. More particularly, the X and Y axes of the multi-species injection device locate a containment plane and in which the containment plane is perpendicular to or incident with a drive shaft of the internal combustion engine when operatively associated with the internal combustion engine.

Figure 5:
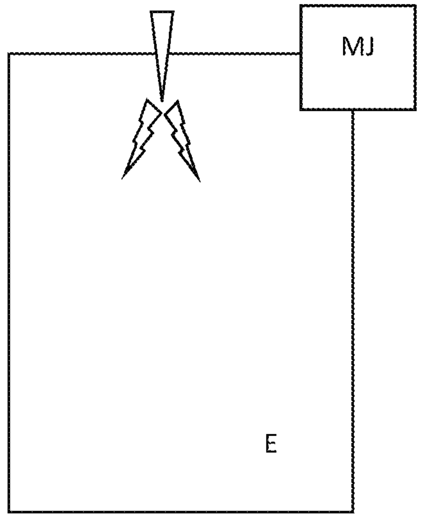
FIG. 5 shows a spark ignition engine implementing a device according to FIGS. 1-3.

Advantageously, the multi-species injection system allows not only to simplify the assembly of the internal combustion engine E exemplified in FIG. 5, but also allows to limit the overall dimensions of the injection system.

When the internal combustion engine comprises two or more cylinders arranged in line, the corresponding two or more multi-species injection systems are arranged so that the relative planes identified by the X and Y axes are parallel to each other.

This fact makes it possible to adopt two ducts (rails) for the distribution of the two fuels that are perfectly straight and arranged parallel to each other and to the crankshaft of the internal combustion engine.

Variants of the non-limiting example described are possible, without however departing from the scope of protection of the present invention, including all equivalent embodiments for a person skilled in the art, to the contents of the claims.

From the description given above, the person skilled in the art is capable of realizing the object of the invention without introducing further constructive details.

What is claimed is:

1. A fuelling method of a spark-ignition internal combustion engine comprising:

performing a preliminary methane quality analysis procedure, wherein the preliminary methane quality analysis procedure comprises varying fuel supply parameters of the spark-ignition internal combustion engine, analyzing a gaseous species contained in exhaust gases produced as a result of the varying of the fuel supply parameters, and obtaining a methane quality;

mixing, on board a vehicle, methane and hydrogen according to the obtained methane quality; and iterating the performing of the preliminary methane quality analysis procedure and the mixing of methane and hydrogen to generate a mixture of methane and hydrogen based on dynamic methane quality.

2. The fuelling method according to claim 1, wherein the preliminary methane quality analysis procedure comprises a step of inhibiting an injection of hydrogen for an entire duration of the preliminary methane quality analysis procedure.

3. The fuelling method according to claim 1, wherein the mixing of methane and hydrogen is based on a function of at least one operating parameter of the spark-ignition internal combustion engine.

4. The fuelling method according to claim 1, wherein the ratio between methane and hydrogen is enriched in hydrogen at least under one of the following operating conditions:

1) At a low idle comprising a minimum idle 2) in cruising conditions with a torque delivery lower than a pre-set percentage comprising 35% of a maximum deliverable torque, 3) in conditions of intake air and/or engine coolant temperature below a predetermined temperature threshold.

5. A spark ignition internal combustion engine comprising at least one cylinder having an intake manifold and at least one methane and hydrogen injection device operatively connected with the intake manifold and a processing unit configured to:

perform a preliminary methane quality analysis procedure, wherein the preliminary methane quality analysis procedure comprises varying fuel supply parameters of the spark-ignition internal combustion engine, analyze a gaseous species contained in exhaust gases produced as a result of the varying of the fuel supply parameters, and obtain a methane quality;

mix, on board a vehicle, methane and hydrogen according to the obtained methane quality; and iterate the performing of the preliminary methane quality analysis procedure and the mixing of methane and hydrogen to generate a mixture of methane and hydrogen based on dynamic methane quality.

6. The spark ignition internal combustion engine according to claim 5, further comprising means for a preliminary analysis of the methane quality.

7. The spark ignition internal combustion engine according to claim 6, wherein the preliminary analysis comprises a methane quality analysis sensor, or is integrated in the processing unit, wherein the processing unit is configured to vary at least one first engine operating parameter and to observe at least one second engine operating parameter to estimate the methane quality.

8. The spark ignition internal combustion engine according to claim 7, wherein the processing unit are configured to enrich in hydrogen at least under one of the following operating conditions:

1) At a low idle comprising a minimum idle 2) in cruising conditions with a torque delivery lower than a pre-set percentage comprising 35% of a maximum deliverable torque, 3) in conditions of intake air and/or engine coolant temperature below a predetermined temperature threshold.

* * * * *